United States Patent
Kim et al.

(10) Patent No.: US 7,822,940 B2
(45) Date of Patent: Oct. 26, 2010

(54) APPARATUS AND METHOD FOR MANAGING MAPPING INFORMATION OF NONVOLATILE MEMORY

(75) Inventors: Jin-kyu Kim, Gwangjin-gu (KR); Kyoung-il Bang, Suwon-si (KR); Song-ho Yoon, Gyeonggi-do (KR); Woon-jae Chung, Gunpo-si (KR); Min-young Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 764 days.

(21) Appl. No.: 11/655,215

(22) Filed: Jan. 19, 2007

(65) Prior Publication Data
US 2007/0192533 A1    Aug. 16, 2007

(30) Foreign Application Priority Data
Feb. 16, 2006   (KR) .................. 10-2006-0015198

(51) Int. Cl.
G06F 12/10    (2006.01)
(52) U.S. Cl. .................................................... 711/202
(58) Field of Classification Search .................. None
See application file for complete search history.

(56) References Cited

U.S. PATENT DOCUMENTS

| | | | |
|---|---|---|---|
| 5,907,856 A | 5/1999 | Estakhri et al. | |
| 2002/0041517 A1* | 4/2002 | Kim et al. | 365/185.11 |
| 2005/0174849 A1 | 8/2005 | In et al. | |

FOREIGN PATENT DOCUMENTS

| | | |
|---|---|---|
| JP | 2000-20391 A | 1/2000 |
| JP | 2005-222550 A | 8/2005 |
| KR | 1999-0075161 A | 10/1999 |
| KR | 2004-0072875 A | 8/2004 |

* cited by examiner

*Primary Examiner*—Tuan V Thai
*Assistant Examiner*—Duc T Doan
(74) *Attorney, Agent, or Firm*—Sughrue Mion, PLLC

(57) ABSTRACT

Provided is an apparatus and method for managing mapping information of a nonvolatile memory, in which a time period required for a request for access to a logic sector of the nonvolatile memory is minimized. The apparatus includes an extractor which extracts a logical sector mapped with each physical sector in physical units mapped with a predetermined logical unit, a mapping information generator which generates mapping information of logical sectors belonging to the logical unit including the extracted logical sector, and a mapping information memory which stores the generated mapping information.

14 Claims, 15 Drawing Sheets

FIG. 3 (RELATED ART)

| OFFSET OF PHYSICAL SECTOR IN PHYSICAL UNIT WHERE LOGICAL SECTOR 0 IS STORED |
|---|
| OFFSET OF PHYSICAL SECTOR IN PHYSICAL UNIT WHERE LOGICAL SECTOR 1 IS STORED |
| OFFSET OF PHYSICAL SECTOR IN PHYSICAL UNIT WHERE LOGICAL SECTOR 2 IS STORED |
| OFFSET OF PHYSICAL SECTOR IN PHYSICAL UNIT WHERE LOGICAL SECTOR 3 IS STORED |

FIG. 10

| PHYSICAL UNIT 3 | 3 |
|---|---|
| PHYSICAL UNIT 3 | 1 |
| PHYSICAL UNIT 3 | 2 |
| - | - |

FIG. 11

| PHYSICAL UNIT 3 | 3 |
|---|---|
| PHYSICAL UNIT 17 | 2 |
| PHYSICAL UNIT 17 | 1 |
| PHYSICAL UNIT 17 | 3 |

FIG. 12

| PHYSICAL UNIT 3 | 3 |
|---|---|
| PHYSICAL UNIT 17 | 2 |
| PHYSICAL UNIT 17 | 1 |
| PHYSICAL UNIT 10 | 0 |

APPARATUS AND METHOD FOR MANAGING MAPPING INFORMATION OF NONVOLATILE MEMORY

CROSS-REFERENCE TO RELATED APPLICATION

This application claims priority from Korean Patent Application No. 10-2006-0015198 filed on Feb. 16, 2006 in the Korean Intellectual Property Office, the disclosure of which is incorporated herein by reference in its entirety.

BACKGROUND OF THE INVENTION

1. Field of the Invention

Apparatuses and methods consistent with the present invention relates to managing mapping information of a nonvolatile memory, and more particularly, to managing mapping information of a nonvolatile memory, in which a time period required for a request for access to a logic sector of the nonvolatile memory is minimized.

2. Description of the Related Art

Generally, embedded systems, such as electric home appliances, communication devices, and set top boxes, widely employ a nonvolatile memory as a storage medium that stores data.

A flash memory, which is mainly used as the nonvolatile memory, is a nonvolatile memory device that can electrically erase or rewrite data. Such a flash memory is widely used as a storage medium for a portable device due to its lower power consumption than a storage medium based on a magnetic disk memory, its fast access time equal to that of a hard disk, and its small size.

Furthermore, the nonvolatile memory can arbitrarily access data stored in a specified position in view of hardware characteristics in the same manner as existing memory devices such as random access memory (RAM) and magnetic storage medium. However, in the case of erasing data, the nonvolatile memory accesses the data in a block unit unlike the existing memory devices. Also, in order to perform writing in a sector in which data are already written, the nonvolatile memory should first erase the whole block including the corresponding sector. This factor deteriorates performance of the nonvolatile memory.

To solve the above problem relating to erase before write, the aforementioned nonvolatile memory supports a logical address and a physical address. In other words, data operation of the logical address, such as reading/writing operation, which is requested from a host, is converted into data operation of the physical address of the actual nonvolatile memory by various mapping algorithms.

A system where the nonvolatile memory is used reconstructs mapping information to reconstruct logical data in accordance with a mapping algorithm when the system is booting. The host searches the position of the physical address, which is mapped with a predetermined logical address, in real time from the nonvolatile memory by referring to the reconstructed mapping information. Thus, the host accesses corresponding data to perform data operation such as reading/writing.

Generally, to maximize performance of the data operation, the nonvolatile memory undergoes two mapping steps. The first mapping step is mapping of a logical unit and a physical unit, wherein a plurality of physical units are mapped with one logical unit. The second mapping step is mapping of a logical sector and a physical sector in each physical unit.

The aforementioned two mapping steps are performed when the system is booting. The host accesses corresponding data through the mapping information reconstructed through the two mapping steps when the data operation of the nonvolatile memory is requested. Also, the mapping information reconstructed through the two mapping steps is updated through the two mapping steps after writing operation of the nonvolatile memory is requested or performed.

FIG. 1 is a view illustrating a related art mapping relation between a logical unit and physical units.

As shown in FIG. 1, physical units 13, 7, 12 and 15 are mapped with a logical unit 0, a physical unit 2 is mapped with a logical unit 1, and physical units 10, 17 and 3 are mapped with a logical unit N. Physical units 20, 1 and, 5 are not mapped with any logical unit. At this time, "Depth" denotes a value showing a use timing of the corresponding physical unit. The physical unit corresponds to the one recently used if its value of "Depth" is great.

FIG. 2 is a view illustrating a mapping relation between a physical sector and a logical sector in a physical unit according to the related art. The case where the mapping relation in the physical unit mapped with the logical unit N in FIG. 1 will exemplarily be described, wherein the logical unit N consists of logical sectors 0, 1, 2, and 3.

As shown in FIG. 2, the physical unit 10 having the greatest value of "Depth" corresponds to one most recently used, and the physical unit 3 having the smallest value of "Depth" corresponds to one first mapped with the logical unit. At this time, the physical sector mapped with the logical sector 0 of the logical unit N becomes the zeroth and the third of the physical unit 3, the physical sector mapped with the logical sector 1 becomes the first of the physical unit 3 and the zeroth and the second of the physical unit 17, the physical sector mapped with the logical sector 2 becomes the second of the physical unit 3 and the first of physical unit 17, and the physical sector mapped with the logical sector 3 becomes the zeroth of the physical unit 17 and the third of the physical unit 10.

The system which uses the nonvolatile memory reconstructs the mapping information through the aforementioned mapping relation when it is booting. The mapping information, as shown in FIG. 3, is comprised of an offset of the physical sector in the physical unit where the logical sector is stored. At this time, since the logical unit N is comprised of logical sectors 0, 1, 2 and 3, the mapping information is comprised of offset of the physical sector for the logical sectors 0, 1, 2 and 3. Accordingly, the mapping information of FIG. 2 according to FIG. 3 is the same as that of FIG. 4. If offset of a plurality of physical sectors exists in one logical sector, the physical sector which is most recently updated is regarded as being valid.

FIG. 5 is a view illustrating a method of processing a reading request in a nonvolatile memory according to the related art. The method of processing a reading request of the logical sector 0 in FIG. 4 will exemplarily be described with reference to FIG. 5.

As shown in FIG. 5, the logical sector 0 is stored in the physical sector 3 of the physical unit 3. Accordingly, to access the logical sector 0, the mapping information of the physical units 10, 17 and 3 should be searched sequentially. Also, to search the physical sector mapped with the logical sector 0, the mapping information should be searched three times.

FIG. 6 is a view illustrating a method of processing a writing request in a nonvolatile memory according to the related art. The method of processing a reading request of the logical sector 0 in FIG. 4 will exemplarily be described with reference to FIG. 6.

As shown in FIG. 6, writing of the logical sector 0 is performed for the physical sector 1 not mapped with the logical sector in the physical unit 10 most recently mapped. At this time, the mapping information of the physical unit 10 is updated because writing is performed for the first physical sector. Also, since the mapping information of the physical unit 10 is updated, the mapping information of the physical sector 3 of the physical unit 3 mapped with the logical sector 0 is also updated, whereby the writing operation is completed.

However, since the aforementioned mapping information is managed per physical unit, many types of mapping information must be searched to search the physical sector mapped with the corresponding logical sector for the reading request and the writing request. Since many memories are used even if the mapping information is updated, there is problem that overhead occurs.

The Korean Patent Unexamined Publication No. 1999-0075161 discloses a method of accessing a flash memory, wherein a memory array is divided into a plurality of operation blocks and each block has a look-up table to improve access time between a logical address and a physical address. This method is to manage mapping information per physical unit but fails to teach a method of solving overhead because many memories for searching and updating mapping information for processing a reading request and a writing request are used.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides an apparatus and method for managing mapping information of a nonvolatile memory, in which mapping information is managed for each logical unit to minimize a time period required for a request for access to a logic sector.

According to an aspect of the present invention, there is provided an apparatus for managing mapping information of a nonvolatile memory, the apparatus including an extractor extracting a logical sector mapped with each physical sector in physical units mapped with a predetermined logical unit, a mapping information generator generating mapping information of a logical sector belonging to the logical unit through the extracted logical sector, and a mapping information memory storing the generated mapping information.

According to another aspect of the present invention, there is provided a method of managing mapping information of a nonvolatile memory, the method including extracting a logical sector mapped with each physical sector in physical units mapped with a predetermined logical unit, generating mapping information of a logical sector belonging to the logical unit through the extracted logical sector, and storing the generated mapping information.

BRIEF DESCRIPTION OF THE DRAWINGS

The above and other aspects of the present invention will be more apparent from the following detailed description of exemplary embodiments taken in conjunction with the accompanying drawings, in which:

FIG. 3 is a view illustrating mapping information according to the related art;

FIG. 10 is a view illustrating mapping information generated through a physical unit 3 of FIG. 9;

FIG. 11 is a view illustrating mapping information of FIG. 10 updated through a physical unit 17;

FIG. 12 is a view illustrating mapping information of FIG. 11 updated through a physical unit 10;

DETAILED DESCRIPTION OF EXEMPLARY EMBODIMENTS OF THE INVENTION

Figure 1:
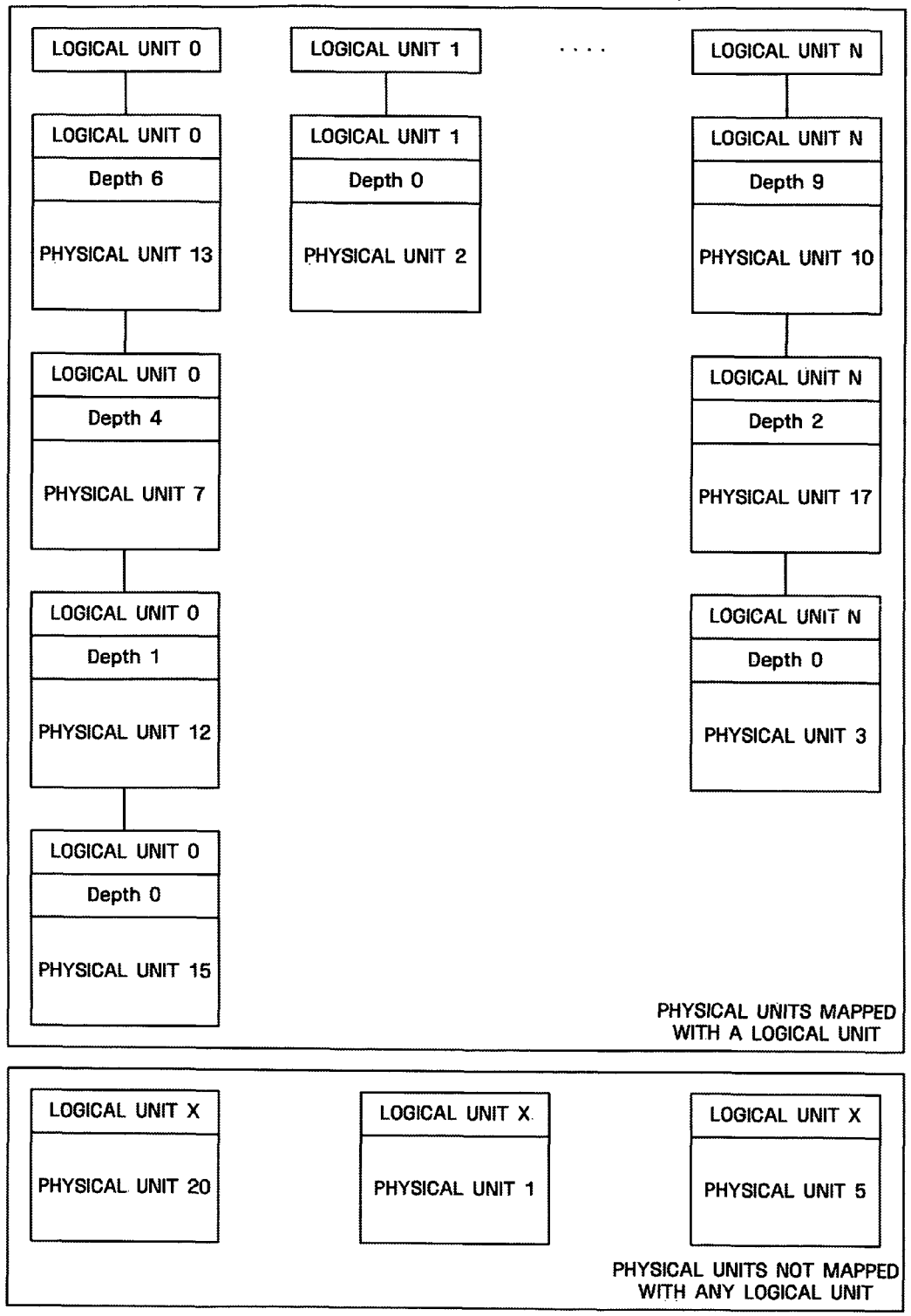
FIG. 1 is a view illustrating a related art mapping relation between a logical unit and physical units.
Figure 2:
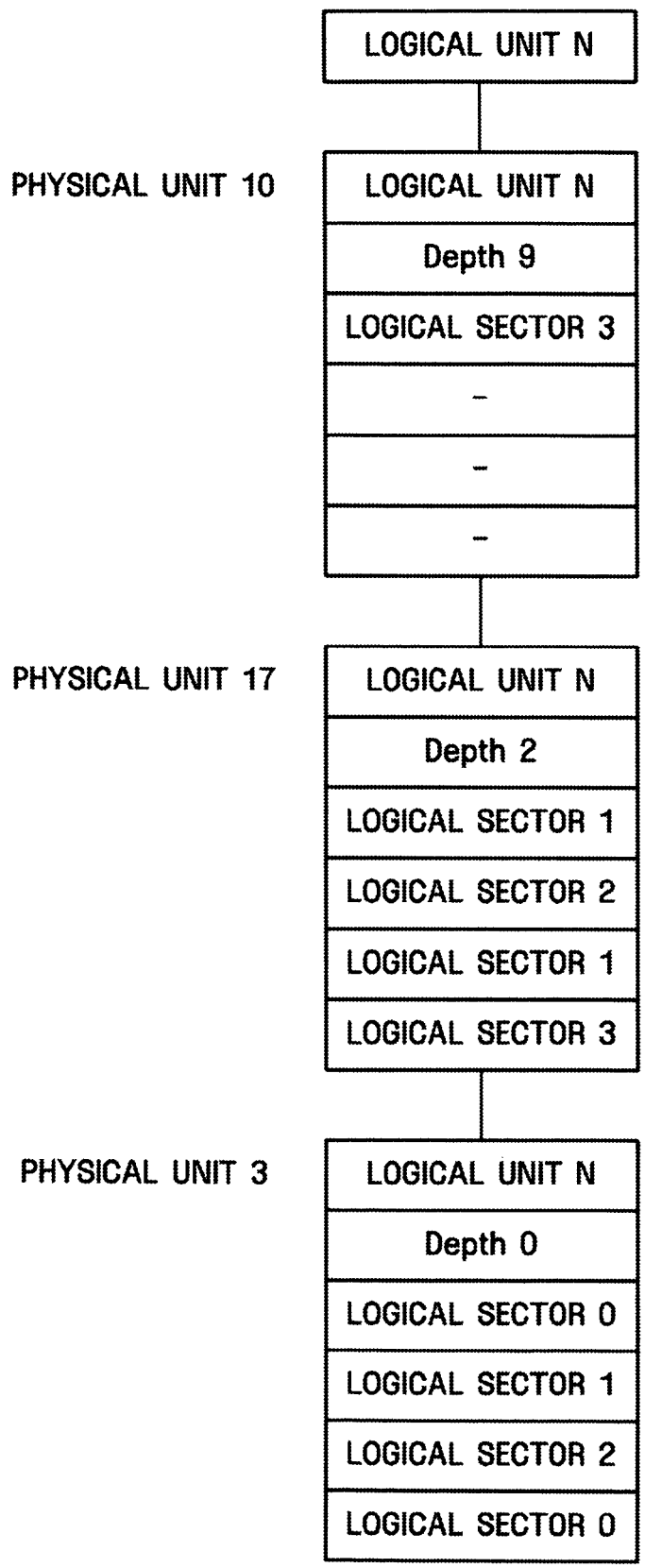
FIG. 2 is a view illustrating a mapping relation between a physical sector and a logical sector in a physical unit according to the related art.
Figure 4:
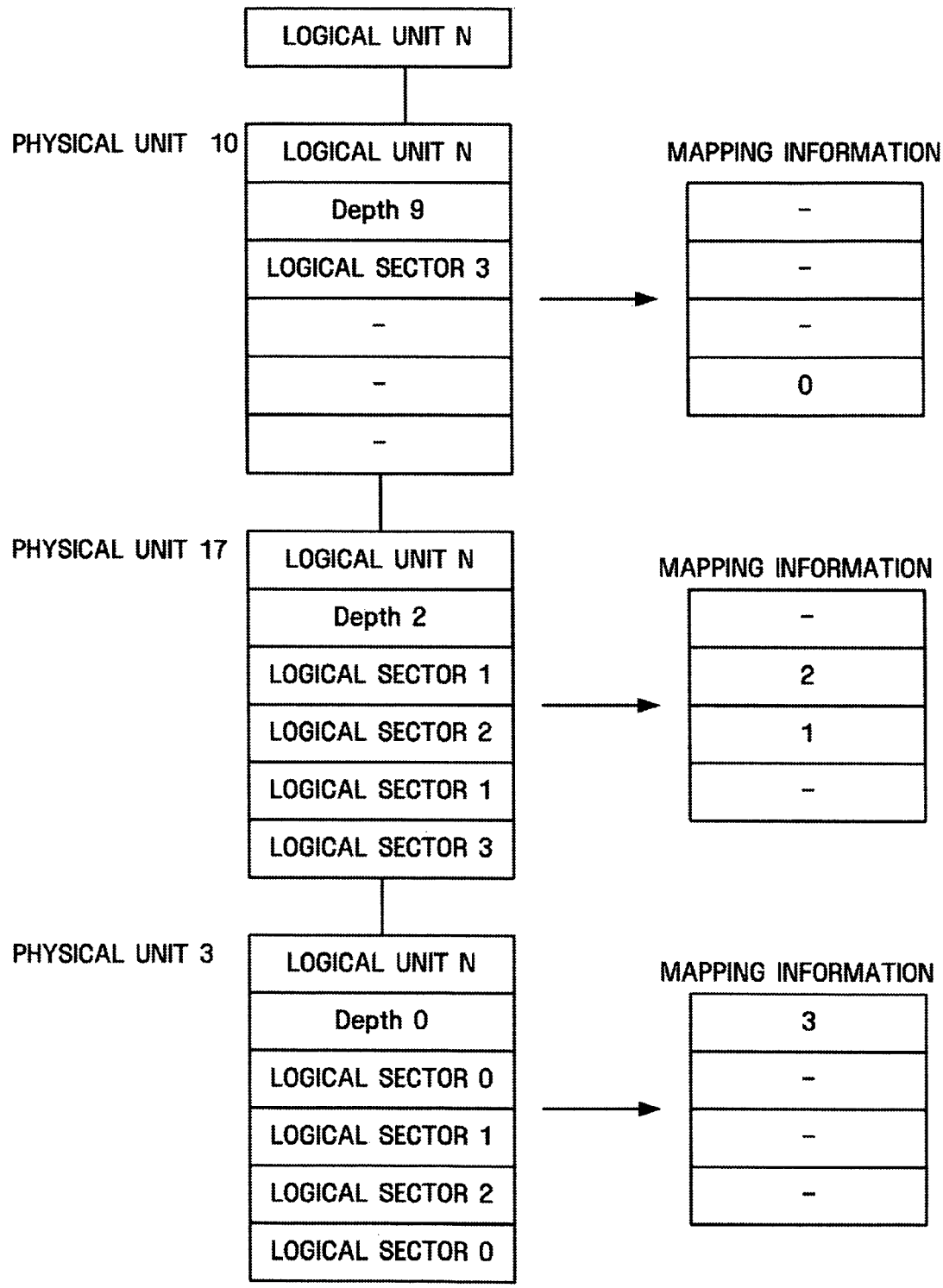
FIG. 4 is a view illustrating mapping information of FIG. 2 according to FIG. 3.
Figure 5:
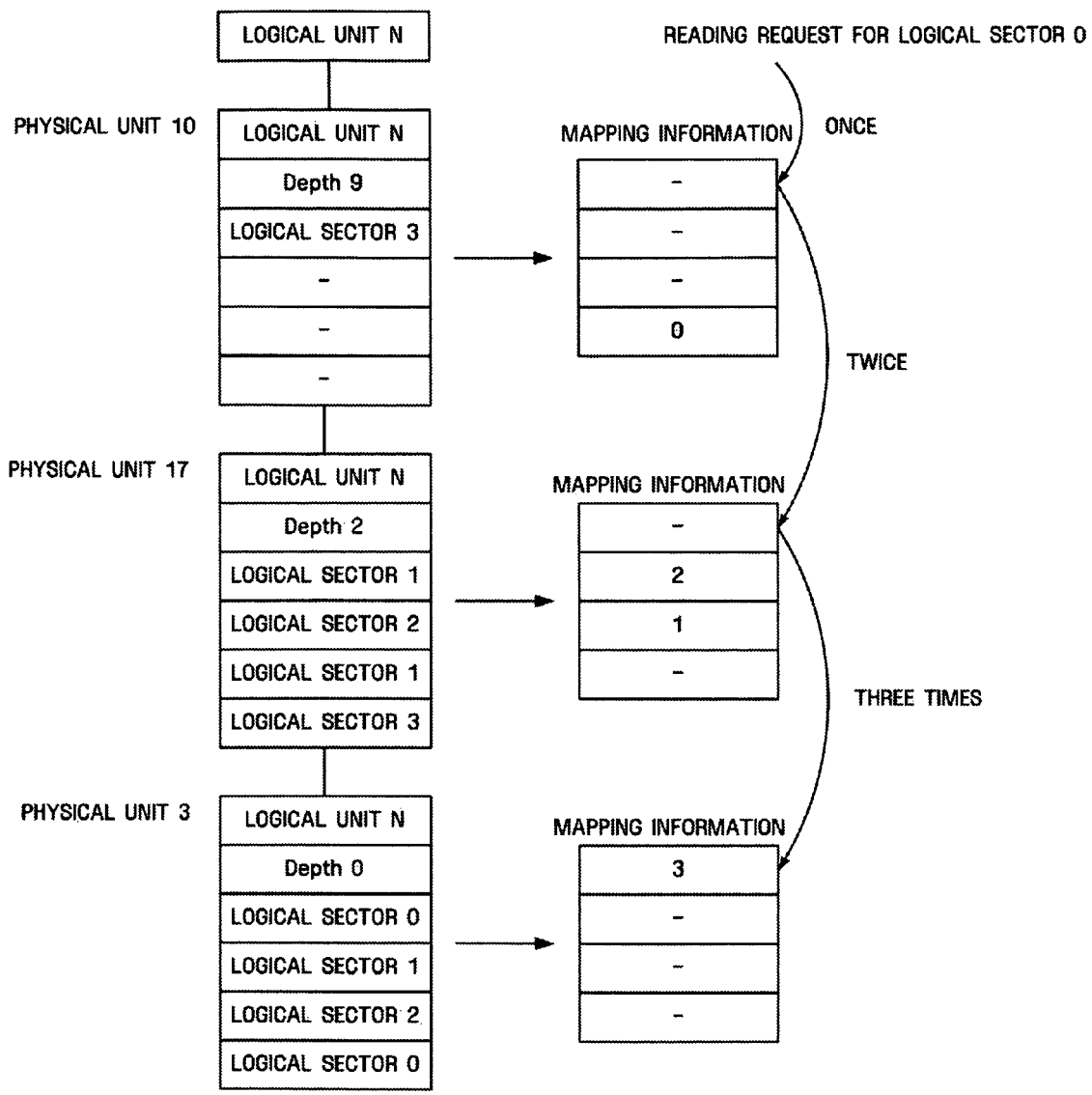
FIG. 5 is a view illustrating a method of processing a reading request in a nonvolatile memory according to the related art.
Figure 6:
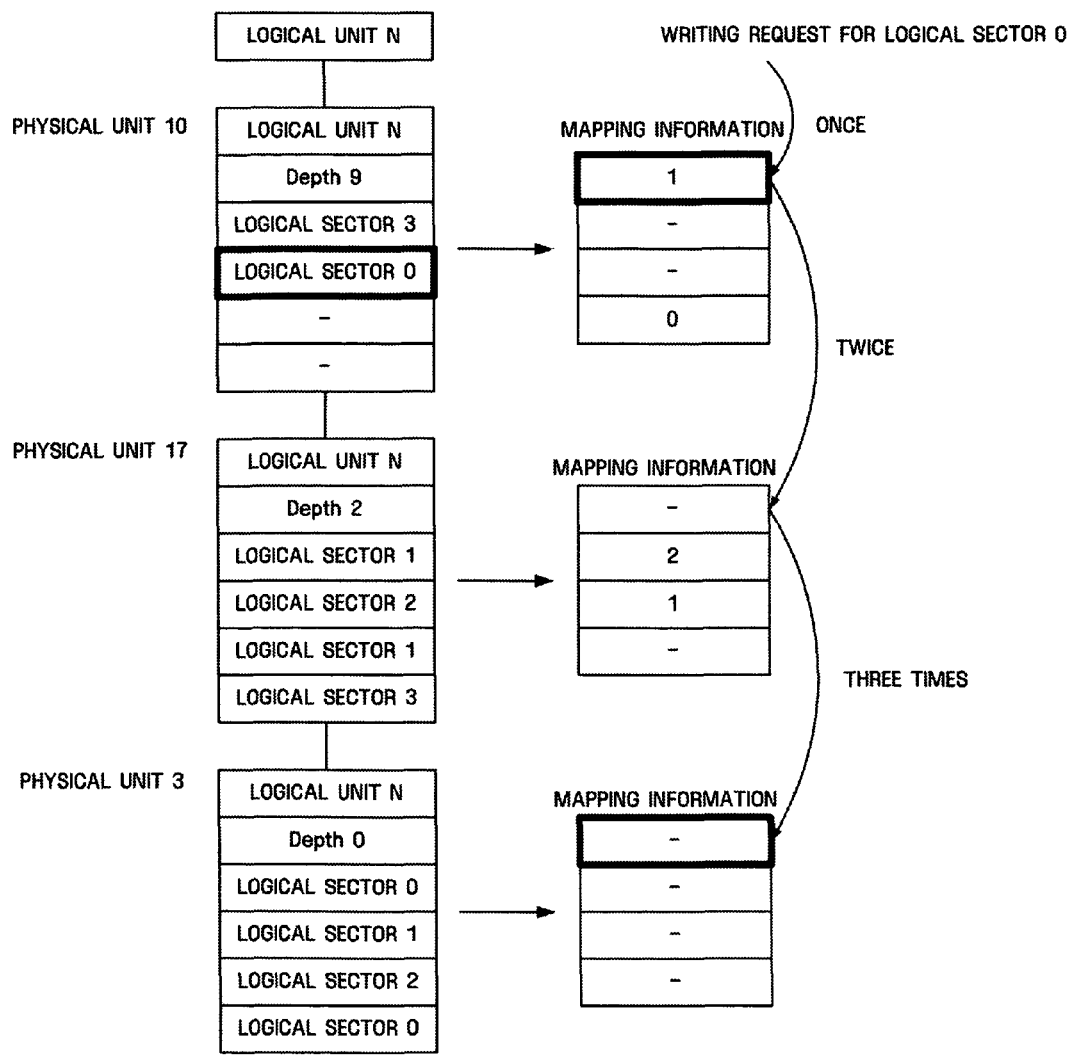
FIG. 6 is a view illustrating a method of processing a writing request in a nonvolatile memory according to the related art.

Hereinafter, exemplary embodiments of the present invention will be described in detail with reference to the accompanying drawings. The aspects and features of the present invention and methods for achieving the aspects and features will be apparent by referring to the exemplary embodiments to be described in detail with reference to the accompanying drawings. However, the present invention is not limited to the exemplary embodiments disclosed hereinafter, but can be implemented in diverse forms. The matters defined in the description, such as the detailed construction and elements, are provided to assist those of ordinary skill in the art in a comprehensive understanding of the invention, and the present invention is only defined within the scope of the appended claims. In the entire description of the exemplary embodiments of the present invention, the same drawing reference numerals are used for the same elements across various figures.

The present invention will be described herein with reference to the accompanying drawings illustrating block diagrams and flowcharts for explaining exemplary embodiments of the present invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Also, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

Generally, a flash memory is divided into a micro block flash memory and a macro block flash memory. In this case, the micro block flash memory has a logical operation unit equal to a physical operation unit. On the other hand, the macro block flash memory has a physical operation unit greater than a logical operation unit. The logical operation unit corresponds to an operation unit of a host and is usually called "sector." The physical operation unit corresponds to an actual unit of the flash memory and is usually called "page." For reference, the logical operation unit and the physical operation unit are not limited to sector and page but may have various sizes depending on apparatuses where the flash memory is used.

Figure 7:
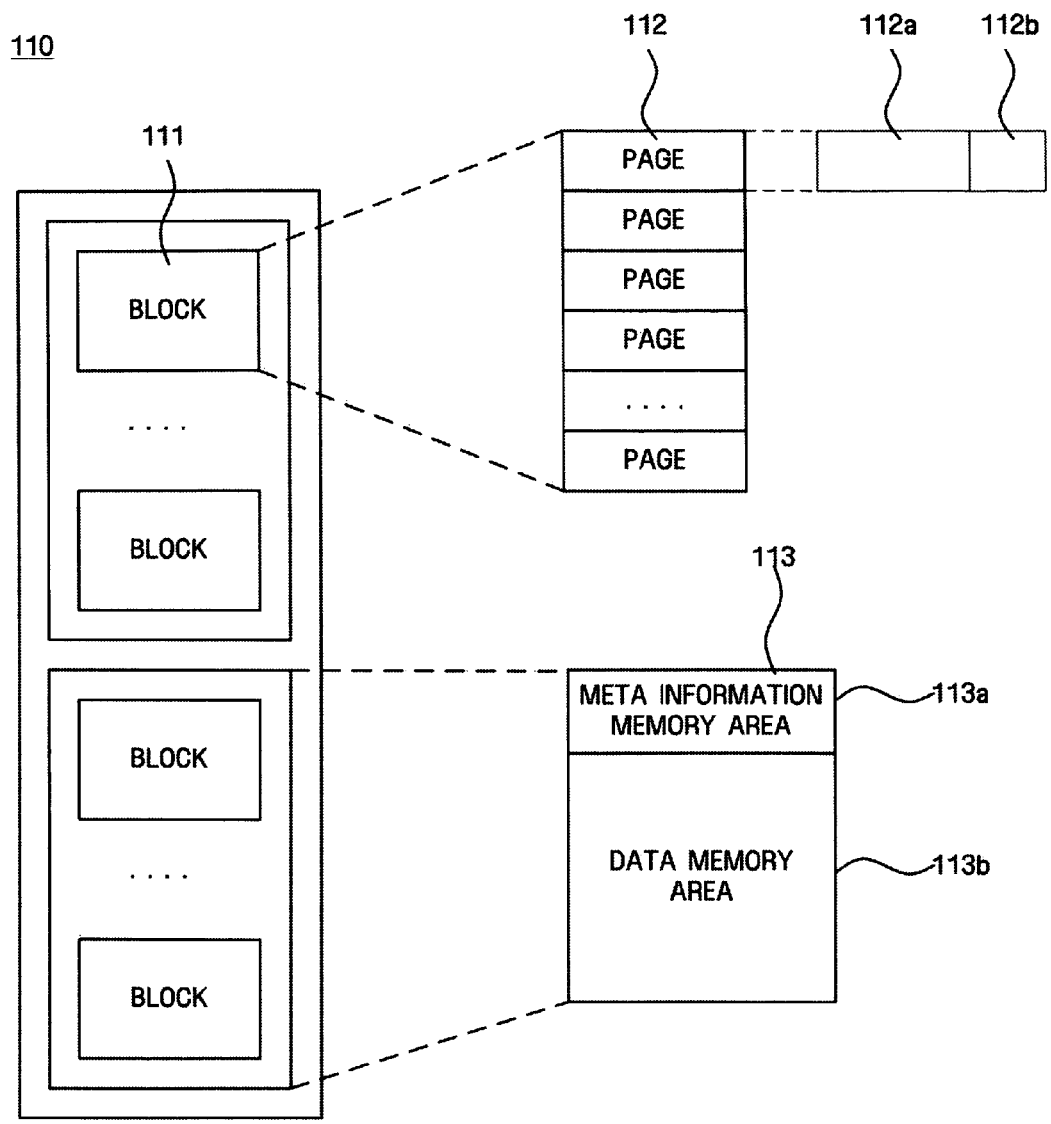
FIG. 7 is a view illustrating a structure of a macro block flash memory according to an exemplary embodiment of the present invention.

FIG. 7 is a view illustrating a structure of a macro block flash memory according to an exemplary embodiment of the present invention.

As shown in FIG. 7, the macro block flash memory 110 according to an exemplary embodiment of the present invention includes a plurality of blocks 111 consisting of a plurality of pages 112, wherein at least one block constitutes a single unit 113. The unit 113 includes a meta information memory area 113a and a data memory area 113b. Among the terms used in the exemplary embodiment of the present invention, "unit" refers to a bundle of a predetermined number of blocks to allow a flash translation layer (FTL) to efficiently manage the blocks, "logical unit" refers to a set of a predetermined number of successive logical block units, and "physical unit" refers to a set of a predetermined number of successive physical block units.

In FIG. 7, the unit 113 will be described as the physical unit. The meta information area 113a can store a logical unit number (LUN) of the logical unit with which a corresponding physical unit is mapped and a value "Depth" showing a use timing of the corresponding physical unit. The value "Depth" is required to decide which physical unit has valid data most recently updated when a plurality of physical units are mapped with one logical unit. Actual data is stored in sectors of a 512 byte unit belonging to a main area 112a of each page 112, and a logical sector number of the stored data is stored in a spare area 112b.

Generally, a plurality of physical units are mapped with one logical unit. A plurality of physical sectors can be mapped with one logical sector at a predetermined time because the FTL supports mapping of 1:n between the units to optimize writing performance. The valid data refers to a sector written by a writing request most recently updated. At this time, information of the physical unit to which the physical sector belongs and exact position information in the physical unit are required to express the position of the valid physical sector.

Figure 8:
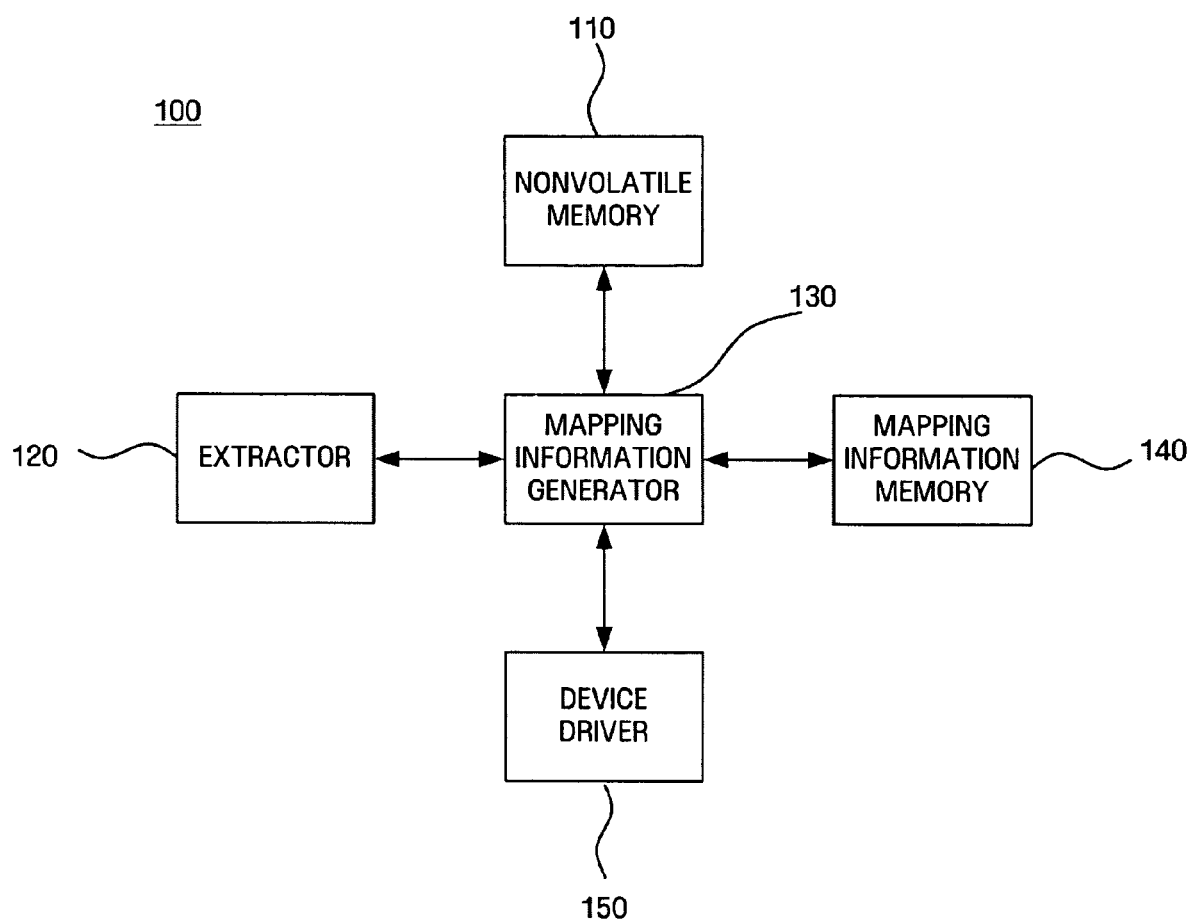
FIG. 8 is a block diagram illustrating the construction of an apparatus for managing mapping information of a nonvolatile memory according to an exemplary embodiment of the present invention.

FIG. 8 is a block diagram illustrating the construction of an apparatus for managing mapping information of a nonvolatile memory according to an exemplary embodiment of the present invention. In the exemplary embodiment of the present invention, the nonvolatile memory will be understood as a flash memory.

As shown in FIG. 8, the apparatus 100 for managing mapping information of a nonvolatile memory according to an exemplary embodiment of the present invention includes a nonvolatile memory 110, an extractor 120 which extracts a logical sector mapped with each physical sector in a physical unit mapped with a predetermined logical unit, a mapping information generator 130 which generates mapping information by updating the physical sector mapped with the logical sector in accordance with a use order of the physical unit, a mapping information memory 140 which stores the generated mapping information, and a device driver 150 which accesses the nonvolatile memory 110 in accordance with reading/writing requests from a host.

It is to be understood that the nonvolatile memory 110 is the same as the aforementioned flash memory of FIG. 7 and its constitution is also the same as that of the flash memory of FIG. 7.

The extractor 120 can extract the logical sector mapped with the physical sector included in each of a plurality of physical units mapped with the predetermined logical unit. At this time, the logical sector can be extracted from the spare area 111b of FIG. 7. Such extraction of the logical sector is performed for all the physical units mapped with each logical unit if a plurality of logical units exist.

The mapping information generator 130 updates the physical sectors mapped with the logical sector extracted from the physical units in order from the physical unit first used to the physical unit most recently used. If the physical unit most recently used is completely updated, the mapping information generator 130 can generate mapping information consisting of a physical unit number where the logical sector is stored and physical sector offset where the logical sector is stored in a corresponding physical unit.

Figure 9:
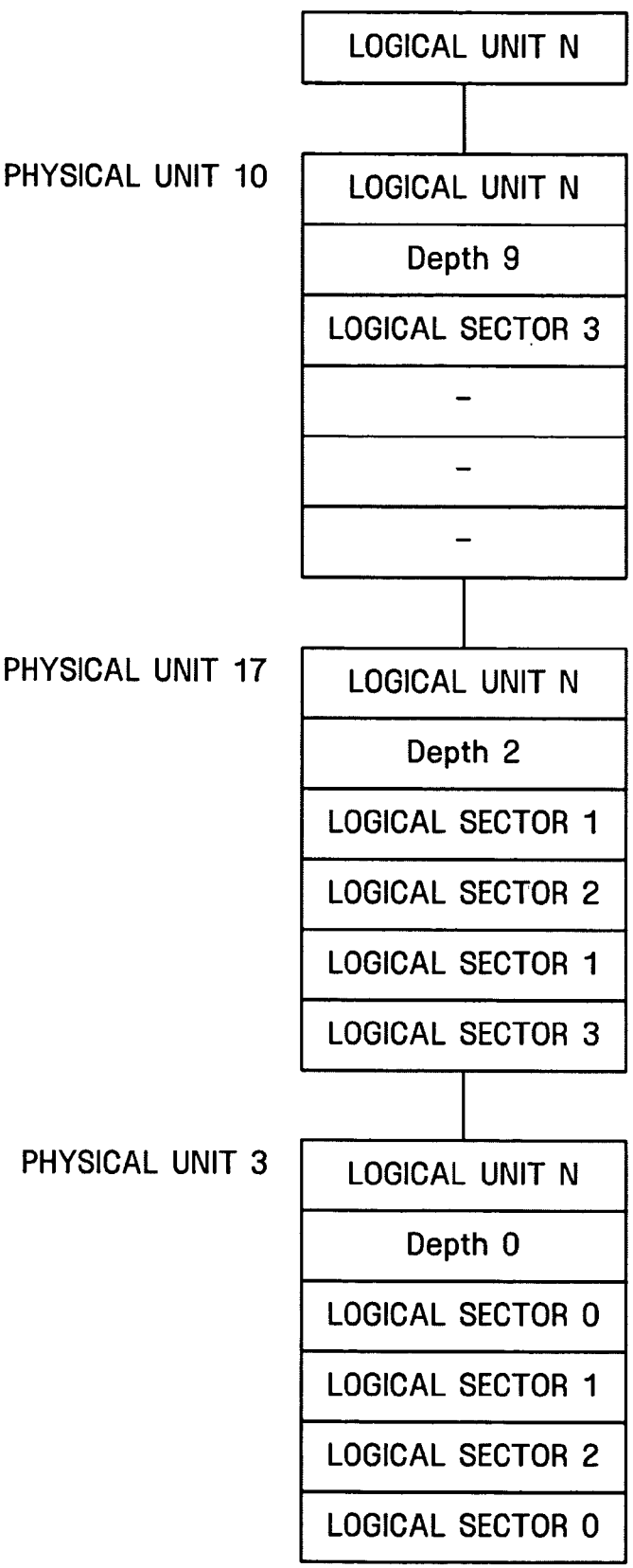
FIG. 9 is a view illustrating a physical unit mapped with a logical unit according to an exemplary embodiment of the present invention.

For example, if the physical units 10, 17 and 3 are mapped with the logical unit N as shown in FIG. 9, the extractor 120 extracts the logical sector mapped with each physical sector in the physical units 10, 17 and 3. At this time, as shown in FIG. 7, the logical sector can be extracted from the spare area 111b. In other words, it is noted that the logical sector 3 is mapped with the physical sector 0 in the physical unit 10, the logical sectors 1, 2, 1, and 3 are respectively mapped with the physical sectors 0, 1, 2 and 3 in the physical unit 17, and the logical sectors 0, 1, 2 and 0 are respectively mapped with the physical sectors 0, 1, 2 and 3 in the physical unit 3.

At this time, the mapping information generator 130 starts to update mapping information, which consists of the physical unit number where the logical sector is stored and the physical sector offset where the logical sector is stored in the corresponding physical unit, in the order from the physical unit first used.

For example, if the mapping information generator 130 generates mapping information through the physical unit 3 first used, mapping information of the logical sector 0 to the logical sector 3 can be generated as shown in FIG. 10. At this time, since the data are written in the physical unit in due order from the physical sector 0 to the physical sector 3, the most recently written data is regarded as being the most recently updated data in the same physical unit. Accordingly, the mapping information corresponding to the physical sector 3 of the logical sector 0 is generated.

Afterwards, the mapping information generator 130 can update the mapping information through the logical sector extracted from the physical unit 17 used next to the physical unit 3. For example, for the mapping information of FIG. 10, the physical sector 1 of the physical unit 3 mapped with the logical sector 1 can be updated as the physical sector 3 of the physical unit 17 as shown in FIG. 11. Also, it is noted that the physical sector 3 of the physical unit 17 is mapped with the logical sector 3 with which the physical sector is not mapped in FIG. 10.

Likewise, as shown in FIG. 12, the mapping information generator 130 can generate mapping information of all the physical units whose update is completed by updating the physical unit 10 if the physical unit 17 is completely updated. This operation of generating the mapping information can be repeated for all the physical units.

The mapping information generated by the mapping information generator 130 is stored in the mapping information memory 140 so that the nonvolatile memory 110 can process a reading request and a writing request by referring to the mapping information stored in the system which uses the nonvolatile memory 110. At this time, since the nonvolatile memory refers to the mapping information generated for each logical unit to access the corresponding logical sector, it can access the corresponding sector at a faster time period than the case where the mapping information is managed for each physical unit.

Figure 13:
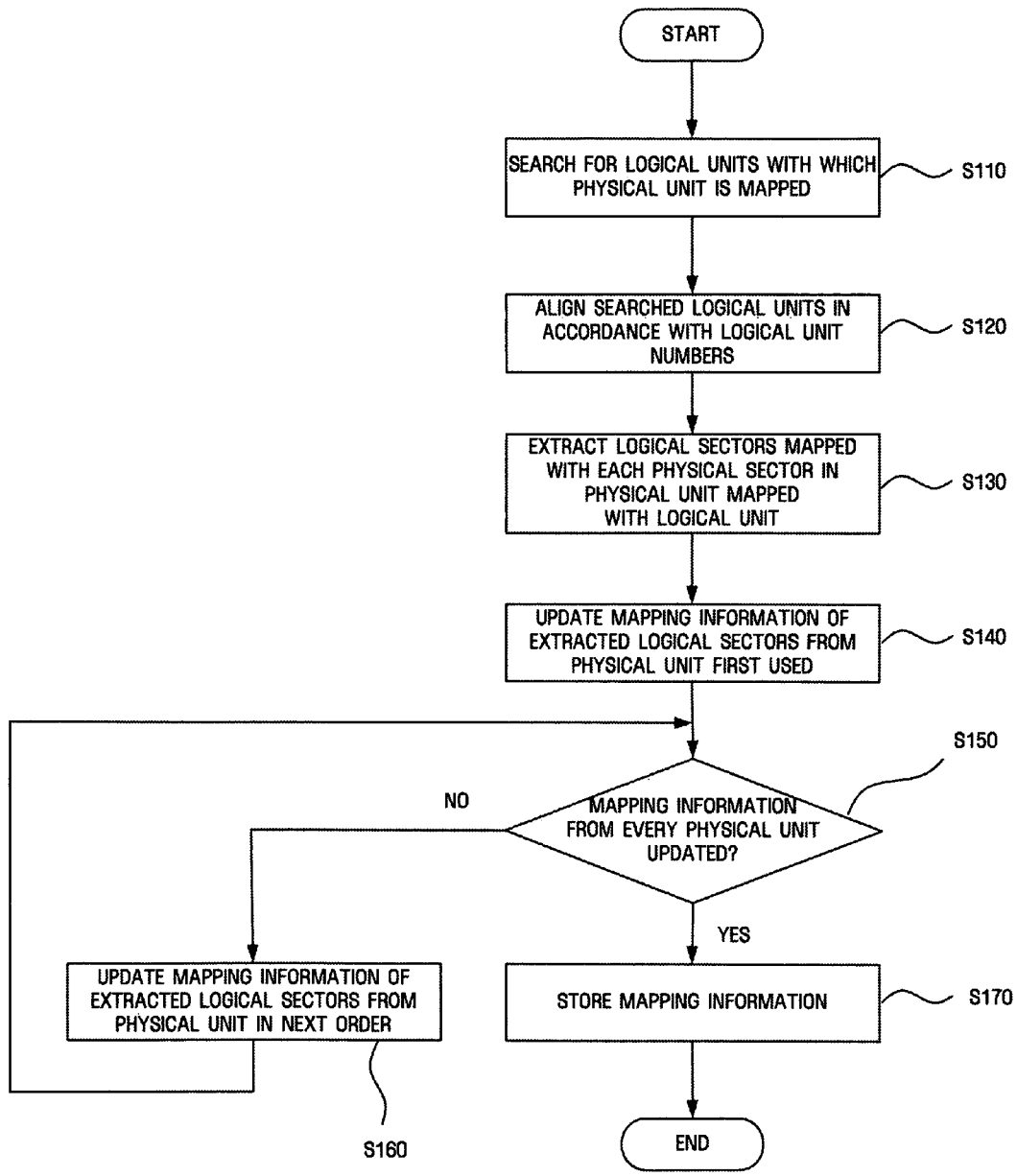
FIG. 13 is a flowchart illustrating a method of generating mapping information according to an exemplary embodiment of the present invention.

FIG. 13 is a flowchart illustrating a method of generating mapping information according to an exemplary embodiment of the present invention.

As shown in FIG. 13, when the system which uses the nonvolatile memory 110 is booting, the extractor 120 searches all the logical units for logical units with which the physical unit is mapped (S110).

The extractor 120 aligns the searched logical units in accordance with logical unit numbers (S120), and then extracts the logical sectors mapped with each physical sector in the physical unit mapped with the logical unit, according to the logical unit numbers (S130).

The mapping information generator 130 starts to update the mapping information of the extracted logical sectors in the order from the physical unit first used (S140). At this time, among a plurality of physical units mapped with the predetermined logical unit, the physical unit first used is first updated, and physical units are updated in accordance with the order of the physical sectors.

Afterwards, it is decided whether all the physical units are completely updated (S150). As a result, if all the physical units are not completely updated, the physical unit of the next order is updated (S160). In this case, the physical unit of the next order refers to one used next after the physical unit first used. If all the physical units are completely updated, the mapping information is stored in the mapping information memory area 140 (S170).

Figure 14:
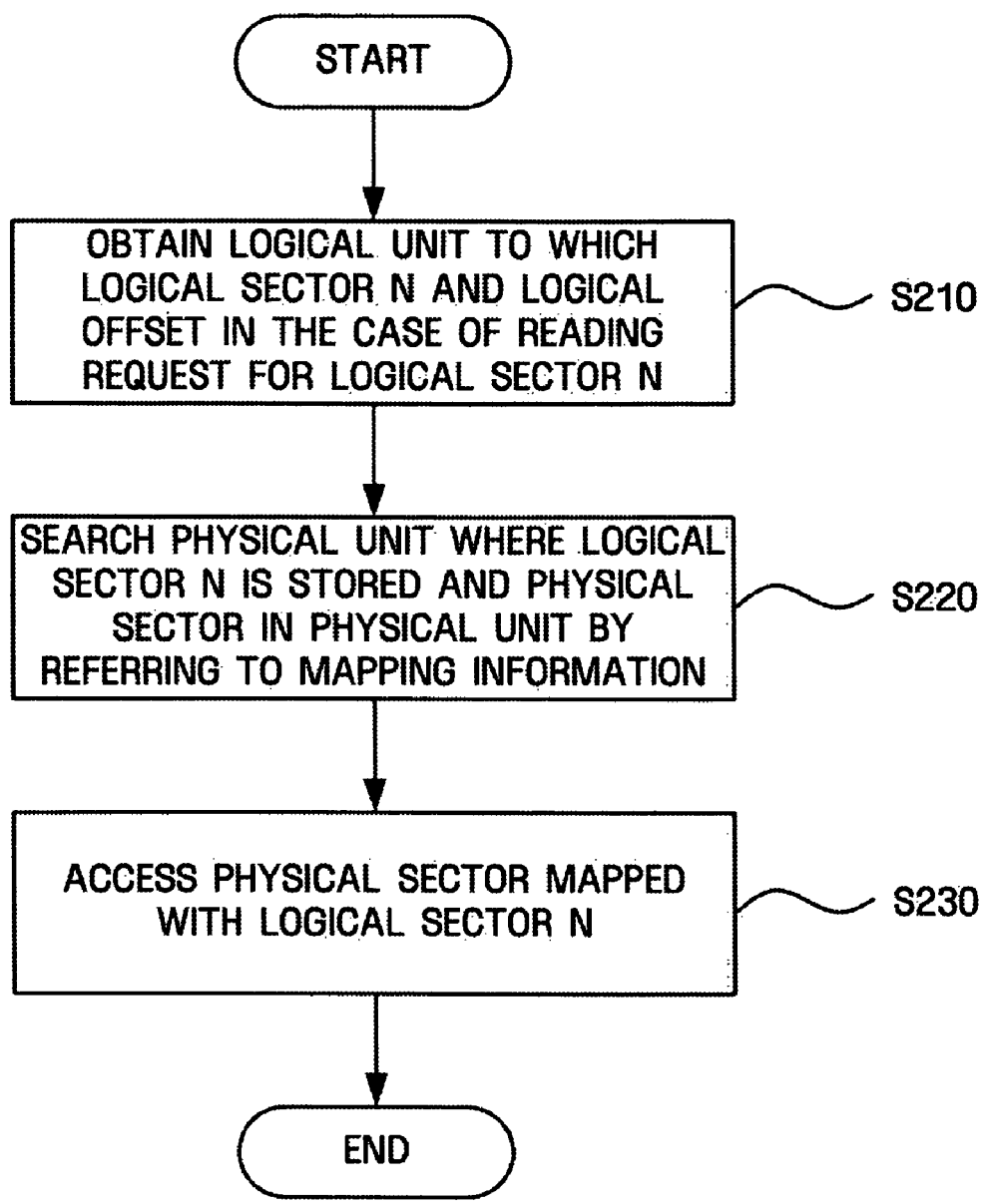
FIG. 14 is a flowchart illustrating a method of processing a reading request according to an exemplary embodiment of the present invention.

FIG. 14 is a flowchart illustrating a method of processing a reading request according to an exemplary embodiment of the present invention. An example of a reading request of the logical sector N from the host will be described with reference to FIG. 14.

Referring to FIG. 14, if the reading request of the logical sector N is addressed from the host, a logical unit number to which the logical sector N corresponding to the reading request belongs and logical offset in a corresponding logical unit are obtained (S210).

At this time, the device driver 150 searches the physical sector and the physical unit number to which the logical sector N belongs in the corresponding logical unit by referring to the mapping information stored in the mapping information memory 140 through the obtained logical offset (S220).

Afterwards, the device driver 150 accesses the logical sector N in accordance with the searched physical unit number and the searched physical sector (S230).

Figure 15:
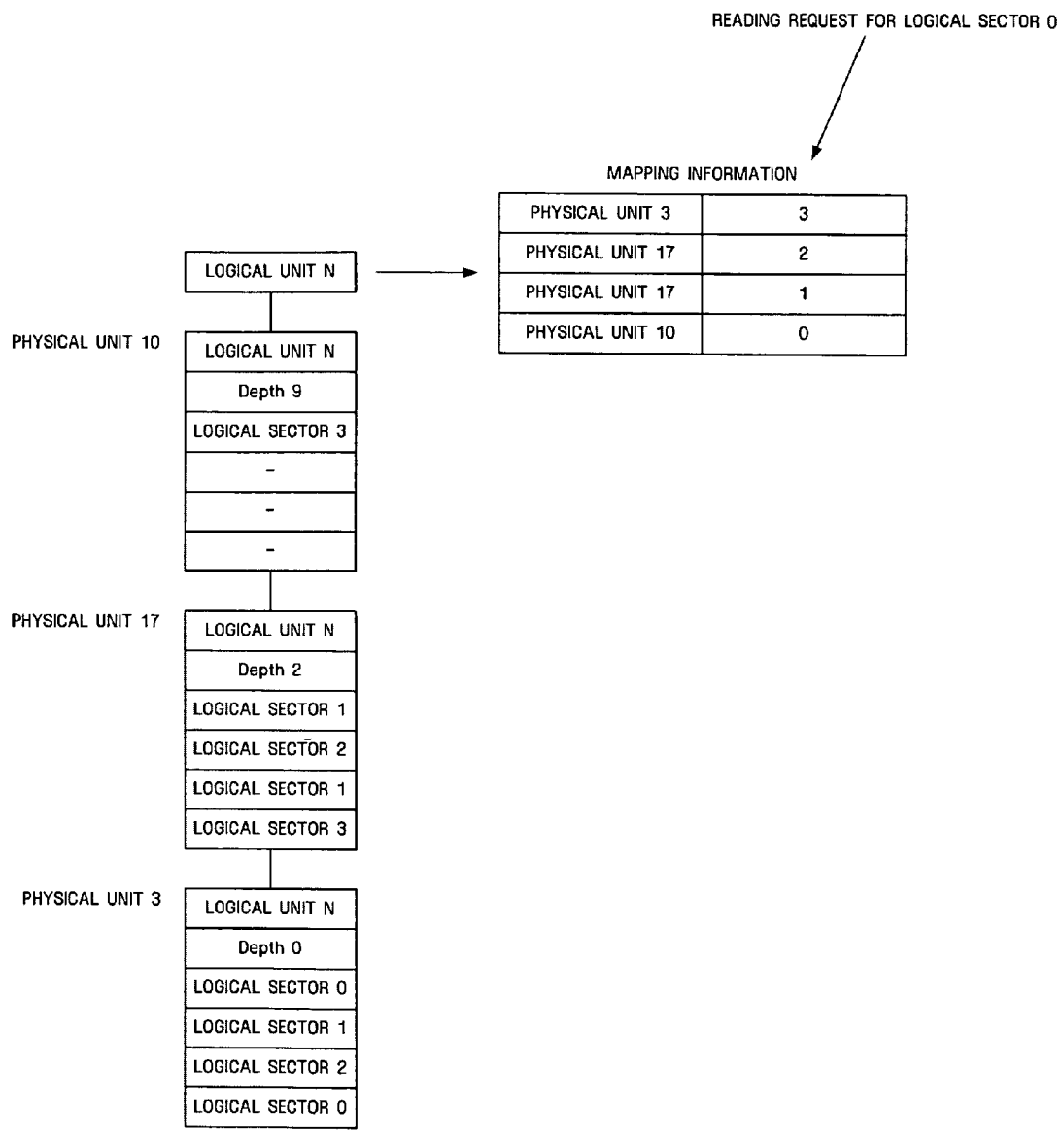
FIG. 15 is a view illustrating mapping information updated in the case of a reading request according to an exemplary embodiment of the present invention.

For example, in the case of a reading request of the logical sector 0, after obtaining a logical unit number to which the logical sector 0 belongs and logical offset in the corresponding logical unit as shown in FIG. 15, the device driver 150 accesses the physical sector mapped with the logical sector 0 by referring to the mapping information.

Figure 16:
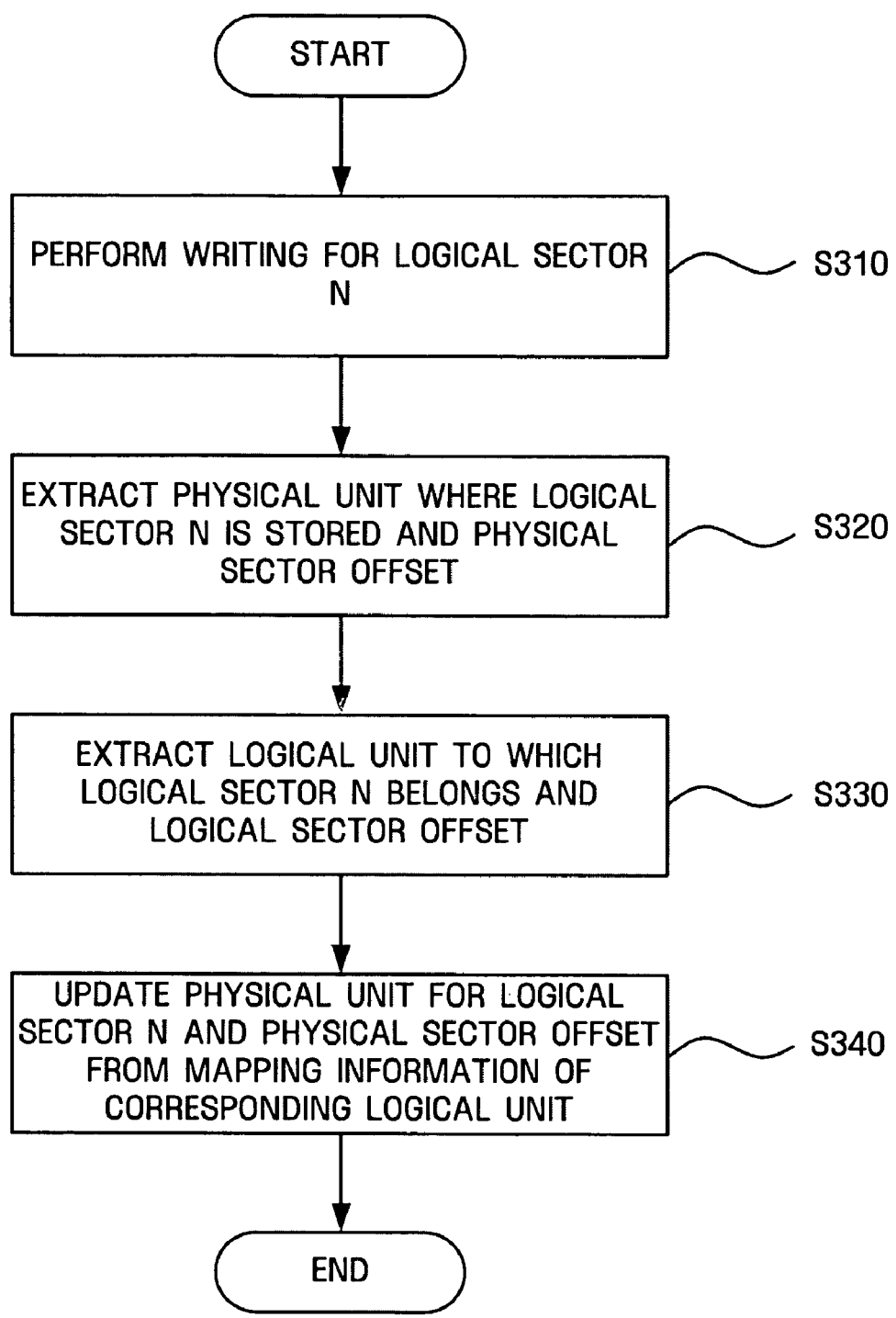
FIG. 16 is a view illustrating a method of processing a writing request according to an exemplary embodiment of the present invention.

FIG. 16 is a flowchart illustrating a method of processing a writing request according to an exemplary embodiment of the present invention. An example of a writing request for the logical sector N from the host will be described with reference to FIG. 16.

As shown in FIG. 16, the device driver 150 writes the data in the physical sector in the physical unit mapped most recently, for the logical sector N where writing is requested from the host (S310).

In the exemplary embodiment of the present invention, the case where the data are written in the physical sector in the physical unit mapped most recently has been described but is nothing but an example to assist understanding of the present invention. If no empty physical sector exists in the physical unit mapped most recently, the physical unit not mapped may newly be mapped to write the data therein.

The device driver 150 extracts the physical unit number where the logical sector N is written and the physical sector offset in the physical unit (S320).

Furthermore, the device driver 150 extracts the logical unit number to which the logical sector N belongs and the logical sector offset (S330).

Afterwards, the mapping information generator 130 updates the physical unit number to which the logical sector N belongs and the physical sector offset from the mapping information of the corresponding logical unit (S340).

Figure 17:
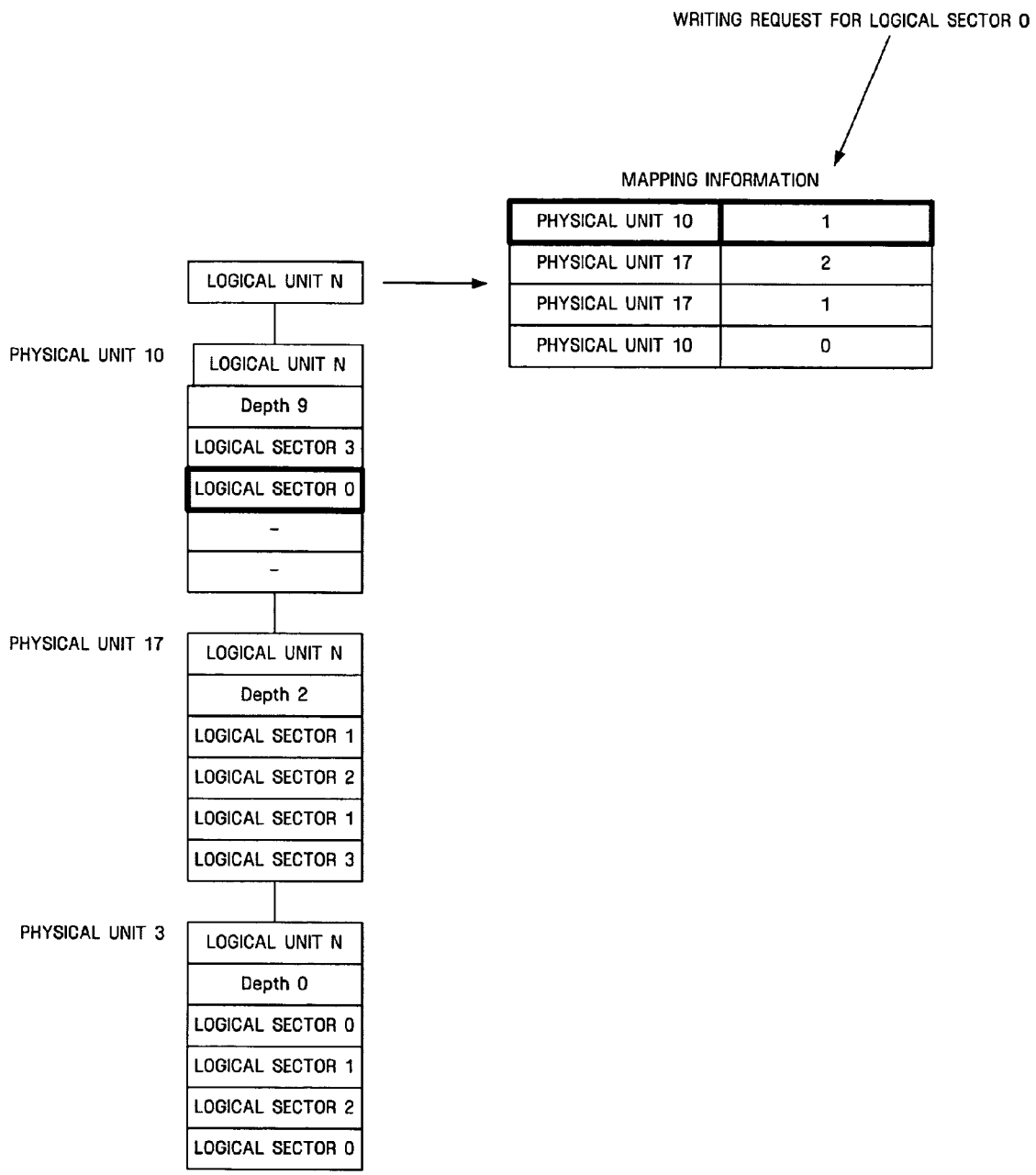
FIG. 17 is a view illustrating mapping information updated in the case of a writing request according to an exemplary embodiment of the present invention.

For example, in the case of a writing request of logical sector 0, the device driver 150 writes the data in the first physical sector of the most recently used physical unit 10, as shown in FIG. 17. After the device driver 150 extracts the physical unit number where logical sector 0 was written and the physical sector, as well as, the logical unit number to which logical sector 0 belongs and logical sector offset, the mapping information generator 130 updates the mapping information.

In the exemplary embodiments of the present invention, the term "unit", as used herein, refers to, but is not limited to, a software or hardware component, such as a Field Programmable Gate Array (FPGA) or Application Specific Integrated Circuit (ASIC), which performs certain tasks. A unit may be configured to reside on the addressable storage medium and configured to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units.

As described above, according to an apparatus and method for managing mapping information of a nonvolatile memory, in which the position where the logical sector is stored can be identified by minimum overhead in the case of the reading request of the logical sector. Also, the mapping information can be updated by minimum overhead after writing in the case of the writing request of the nonvolatile memory.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. An apparatus for managing mapping information of a nonvolatile memory, the apparatus comprising:
    an extractor which extracts a logical sector mapped with each of a plurality of physical sectors in a plurality of physical units mapped with a logical unit;
    a mapping information generator which generates mapping information of a plurality of logical sectors belonging to the logical unit, wherein said plurality of logical sectors includes the extracted logical sector; and
    a mapping information memory which stores the generated mapping information,
    wherein the mapping information generator updates the mapping information of logical sector extracted from each of the plurality of physical units in order from the physical unit first used to the physical unit most recently used among the plurality of physical units.

2. The apparatus of claim 1, wherein the extractor searches the logical unit, and extracts the logical sector in accordance with a result of the search.

3. The apparatus of claim 1, wherein the mapping information comprises a physical unit number corresponding to where the a corresponding logical sector is stored and a logical sector offset corresponding to where the corresponding logical sector is stored in each of the plurality of physical units.

4. The apparatus of claim 1, further comprising a device driver which performs a data operation of the logical sector by referring to the mapping information.

5. The apparatus of claim 4, wherein the mapping information generator updates the generated mapping information when the device driver performs a writing operation.

6. The apparatus of claim 5, wherein the device driver extracts a physical unit number corresponding to where the writing operation is performed and a physical sector offset, and the mapping information generator searches a logical unit number to which the logical sector corresponding to where the writing operation is performed belongs and a logical sector offset so as to update the physical unit number corresponding to the logical sector offset and the physical sector offset.

7. The apparatus of claim 5, wherein the device driver searches the physical unit number corresponding to where the logical sector is stored and the physical sector offset by referring to the generated mapping information in the case of a reading request of the logical sector.

8. A method of managing mapping information of a nonvolatile memory, the method comprising:
    extracting a logical sector mapped with each of a plurality of physical sectors in a plurality of physical units mapped with a logical unit;
    generating mapping information of a plurality of logical sectors belonging to the logical unit, wherein said plurality of logical sectors includes the extracted logical sector; and
    storing the generated mapping information,
    wherein the generating the mapping information comprises updating the mapping information of the logical sector extracted from each of the plurality of physical units in order from the physical unit first used to the physical unit most recently used among the plurality of physical units.

9. The method of claim 8, wherein the extracting the logical sector comprises searching the logical unit, and extracting the logical sector in accordance with a result of the search.

10. The method of claim 8, wherein the mapping information comprises a physical unit number corresponding to where the corresponding logical sector is stored and a logical sector offset corresponding to where the corresponding logical sector is stored in each of the plurality of physical units.

11. The method of claim 8, further comprising performing a data operation of the logical sector by referring to the mapping information.

12. The method of claim 11, wherein the performing the data operation comprises updating the generated mapping information when a writing operation is performed.

13. The method of claim 12, wherein the updating comprises extracting a physical unit number corresponding to where the writing operation is performed and a physical sector offset, and searching a logical unit number to which the logical sector corresponding to where the writing operation is performed belongs and a logical sector offset so as to update the physical unit number corresponding to the logical sector offset and the physical sector offset.

14. The method of claim 11, wherein the performing comprises searching the physical unit number corresponding to where the logical sector is stored and the physical sector offset by referring to the generated mapping information in the case of a reading request of the logical sector.

* * * * *